United States Patent
Hayes et al.

(10) Patent No.: US 7,305,090 B1
(45) Date of Patent: Dec. 4, 2007

(54) METHOD AND SYSTEM FOR USE OF COMMON PROVISIONING DATA TO ACTIVATE CELLULAR WIRELESS DEVICES

(75) Inventors: James M. Hayes, Gladstone, MO (US); Robert C. Lamb, Blue Springs, MO (US); Keith E. Moll, Overland Park, KS (US); Douglas A. Olding, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 823 days.

(21) Appl. No.: 10/660,957

(22) Filed: Sep. 12, 2003

(51) Int. Cl.
H04K 1/00 (2006.01)
H04Q 7/20 (2006.01)

(52) U.S. Cl. .................. 380/249; 380/247; 455/435.1

(58) Field of Classification Search ............... 380/249, 380/247, 250
See application file for complete search history.

(56) References Cited

U.S. PATENT DOCUMENTS

| | | | |
|---|---|---|---|
| 5,357,558 A | 10/1994 | Yoshikawa | |
| 5,454,032 A | 9/1995 | Pinard et al. | |
| 5,657,373 A | 8/1997 | Hermansson et al. | |
| 5,699,407 A | 12/1997 | Nguyen | |
| 5,805,582 A | 9/1998 | Snelling et al. | |
| 5,806,000 A | 9/1998 | Vo et al. | |
| 5,845,207 A | 12/1998 | Amin et al. | |
| 5,887,249 A * | 3/1999 | Schmid | 455/411 |
| 5,943,620 A | 8/1999 | Boltz et al. | |
| 6,393,275 B1 | 5/2002 | Alfred | |
| 6,393,298 B1 | 5/2002 | Fulton | |
| 6,501,946 B1 | 12/2002 | Farah et al. | |
| 6,580,908 B1 | 6/2003 | Kroll et al. | |
| 6,628,934 B2 * | 9/2003 | Rosenberg et al. | 455/411 |
| 6,671,523 B1 | 12/2003 | Niepel et al. | |
| 6,915,132 B2 * | 7/2005 | Chatterjee et al. | 455/435.1 |
| 2001/0041560 A1 | 11/2001 | Tarkiainen et al. | |
| 2002/0153410 A1 | 10/2002 | Santini | |
| 2003/0043763 A1 | 3/2003 | Grayson | |

FOREIGN PATENT DOCUMENTS

EP     1 058 465     12/2000

OTHER PUBLICATIONS

Wireless Review, Faceless Activation, http://www.wirelessreview.com/microsites/magazinearticle.asp?mode=print&magazinearti . . . , printed from the World Wide Web on Mar. 20, 2003.

(Continued)

*Primary Examiner*—Kambiz Zand
*Assistant Examiner*—Ellen Tran

(57) ABSTRACT

A method and system is disclosed for using common provisioning data to activate cellular wireless devices. A wireless carrier may distribute multiple wireless devices containing a common set of pre-activation provisioning data, such as a common MIN/ESN pair, as well as a unique post-activation data, such as a unique ESN. When such a device is powered on, it may use the common pre-activation provisioning data to gain RF access and then enter into a provisioning data session with a provisioning server. Through the provisioning server, the carrier may tie the device to a service account, and the device may acquire and store further post-activation data, such as a unique MIN. The device may thereafter engage in wireless communication service, using its post-activation ESN and MIN as a basis to gain RF access.

20 Claims, 3 Drawing Sheets

OTHER PUBLICATIONS

Telespree, "Intelligent Service Manager (ISM) and Secure Instant Wireless Access$^{SM}$ Protocol," Technical Overview, 2002.

Telespree, "Telespree Intellignet Service Manager—Dynamic Device Activation and Provisioning Software for Wireless Voice & Data Networks," 2002.

Telespree, "Reduce Wireless Activation Costs," http://www.telespree.com/solutions2.1_p.htm, printed from the World Wide Web in Aug. 2003.

Telespree, "Telespree Completes Seamless Integration of Intelligent Activation and Acquisition Solution Over CDMA2000 1X Network," Dec. 2, 2003, http:www.telespree.com/release_12.02.02.htm, printed from the World Wide Web.

"Telespree announce Instant Activation Software for CDMA2000 1X Networks," http://www.3gnewsroom.com/3g_news/oct_02/news_2589.shtml, printed from the World Wide Web on Mar. 20, 2003.

Telespree, "ISM Activation Manager," http://www.telespree.com/products1.2.htm, printed from the World Wide Web on Feb. 18, 2003.

Telespree, "Telespree Secure Instant Wireless Access$^{SM}$ (SIWA$^{SM}$) Protocol," SIWA Overview, Version 1.0, 2002.

WirelessWeek, "Telespree Aims to Cut Activation Costs," Oct. 28, 2002, http://www.wirelessweek.com/index.asp?layout=articlePrint&articleID=CA254726, printed from the World Wide Web.

* cited by examiner

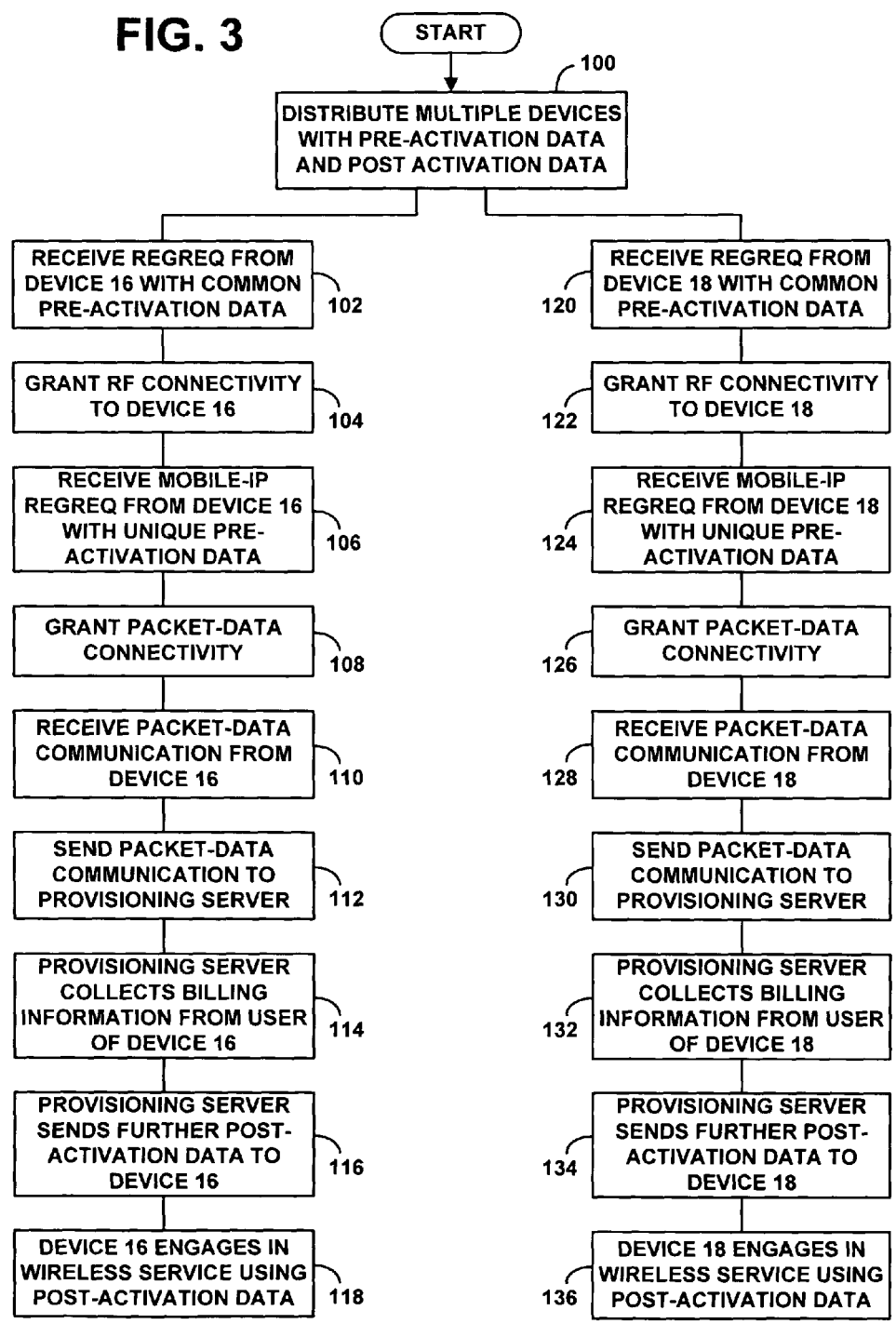

METHOD AND SYSTEM FOR USE OF COMMON PROVISIONING DATA TO ACTIVATE CELLULAR WIRELESS DEVICES

BACKGROUND

1. Field of the Invention

The present invention relates to wireless communications and, more particularly, to provisioning of cellular wireless devices, such as cell phones for instance.

2. Description of Related Art a. Cellular Wireless Communication

Cellular wireless, like other forms of wireless communication, is an increasingly popular means of personal communication in the modern world. People are using cellular wireless networks for the exchange of voice and data over cellular telephones, Personal Digital Assistants (PDAs), cellular telephone modems, and other devices. In principle, a user can communicate over the Internet or call anyone over the Public Switched Telephone Network (PSTN) from any place inside the coverage area of the cellular wireless network.

In a typical cellular wireless system, an area is divided geographically into a number of cell sites, each defined by a radio frequency (RF) radiation pattern from a respective base transceiver station (BTS) tower. Each BTS in a cell is in turn coupled with a base station controller (BSC). And the BSC is then coupled to or functionally integrated within a switch (e.g., a mobile switching center (MSC)) and/or gateway (e.g., a packet data serving node (PDSN)) that provides connectivity with a transport network such as the PSTN or a public or private IP network (e.g., the Internet).

When a wireless device, such as a cell phone, PDA or wirelessly-equipped personal computer, is positioned in a cell, the wireless device may communicate via an RF air interface with the BTS of the cell. A communication can thus be established between the wireless device and another entity on the transport network, via the air interface, the BTS, the BSC and the switch or gateway.

b. Acquisition of RF and Packet-Data Connectivity

Traditionally, each wireless device in a cellular wireless system will have a unique Electronic Serial Number (ESN) and a unique Mobile Identification Number (MIN). The ESN, which is typically hard-coded into the device, identifies the device as a unique physical device and usually includes a manufacturer code and a manufacturer-assigned serial number. The MIN, on the other hand, is typically assigned to the device by a wireless carrier and can function as a subscriber ID. Further, each wireless device may be assigned a special authentication key (A-key), for use in validating its identity.

In typical practice, the MIN, ESN and A-key are used in combination to facilitate authentication of a wireless device when the wireless device seeks to gain access to a wireless carrier's RF resources. For instance, when a wireless device seeks to register in a wireless carrier's network or to initiate a communication via the network, the device may programmatically send into the carrier's network a message that carries (i) its MIN, (ii) its ESN and (iii) an "authentication result" that the device has computed as a predefined function of the MIN, the ESN, and its A-key, among other parameters. One or more entities in the carrier's network may then confirm that the MIN/ESN pair is not currently in use and compare the authentication result provided by the device with a network-computed authentication result, to authenticate the device. If the MIN/ESN pair is not currently in use and the authentication results match, the carrier may allow the device to access the RF network, i.e., to communicate via the RF network. Otherwise, the carrier may deny RF access.

In addition, a wireless device that is capable of engaging in packet-data communication (e.g., IP communication) may have a username and password that the device can use gain packet network connectivity and to engage in packet-data communication. Typically, the username will be assigned by the wireless carrier and will be programmed into the wireless device. The username may take the form of a "network access identifier" (NAI), and the password may be a predefined hash based on the device's unique ESN.

When such a wireless device seeks to gain packet network connectivity, typically after the device first acquires RF connectivity, the device may programmatically send into the carrier's network a message that carries the device's username and password, among other information. An authentication server or other entity in the carrier's network may then validate the username/password (e.g., ensuring that the password is correct, and ensuring that the username is not already in use on the network) and, upon successful validation, may assign an IP address for the device to use. The device may then commence packet data communication via the carrier's network.

c. Provisioning a Wireless Device

When a user first acquires a wireless device or first subscribes to service with a wireless carrier, the wireless carrier will provision the user's wireless device for service. Typically, this involves assigning a MIN and A-key to the device, programming the device with the MIN and A-key, and recording the MIN and A-key in the carrier's network for use in authenticating and granting RF access to the device. Further, if the device is capable of engaging in packet-data communication, this may also involve assigning a username and password to the device, programming the device with the username and password, and recording the username and password in the carrier's network for use in authenticating and granting packet network access to the device.

This provisioning process can be carried out at the point of sale, such as at a retail store where the user buys the wireless device and subscribes to service. In that scenario, a sales technician may collect subscriber billing information such as name, address and credit card number, and establish an account for the device. The carrier may then assign a MIN, username and other provisioning data to the device and record that data in connection with the account, and the technician may program that data into the "Number Assignment Module" (NAM) block of the device for later use.

Alternatively, the provisioning process can be carried out over the air. In a conventional over-the-air service provisioning (OTASP) process, the user would call a customer service center, and a customer service representative would collect subscriber billing information. An entity in the carrier's network would then wirelessly request and receive from the device certain pre-configured parameters. In turn, an authentication server and the device may wirelessly communicate with each other to establish a common secure A-key and other data for use in authenticating the device. And an over-the-air function (OTAF) in the network may then wirelessly transmit other provisioning parameters, such as assigned MIN and username for instance, to the device, which the device may then programmatically store in its NAM block for later use.

Unfortunately, the process of provisioning a wireless device for service thus takes a fair amount of effort. It would therefore be desirable to provide a more simple provisioning mechanism.

SUMMARY

The present invention provides an improved mechanism for provisioning wireless devices. With the benefit of the invention as will be described below, a user can acquire a wireless device and, in effect, instantly begin using the device. When the device first attempts to gain connectivity, the carrier will grant the device a limited-scope of RF access and will tunnel the device to a provisioning server on a data network. The provisioning server will then engage in a provisioning data session with the user, to collect account information and to assign and wirelessly program the device with applicable provisioning parameters. Optimally, this arrangement can make it unnecessary to provision the device at the point of sale or to have the user call a customer service representative to initiate an over-the-air provisioning process.

In accordance with an exemplary embodiment of the invention, each of the wireless devices that a carrier sells or otherwise distributes will come pre-configured with (i) a set of pre-activation provisioning data (or simply "pre-activation data") and (ii) a set of post-activation provisioning data (or simply "post-activation data"). The device will use the pre-activation provisioning data to gain RF connectivity and packet-data connectivity and will then acquire further post-activation provisioning data from a provisioning server for later use in practice.

The pre-activation data on each of the wireless devices will preferably include some "common" pre-activation data and some "unique" pre-activation data. The common pre-activation data may comprise one or more authentication parameters, such as a MIN, an ESN and an A-key, that have the same value on all of the wireless devices, i.e., that are not unique to a given device. Whereas, the unique pre-activation data would comprise one or more authentication parameters, such as a username and password, that have unique values per device. The post-activation data on each device may then comprise one or more authentication parameters, such as a permanent ESN and an A-key, that the device can use once it has actually been provisioned for service.

In the exemplary embodiment, the carrier will allow any device to use the common pre-activation provisioning data as a basis to gain RF connectivity, but the carrier will restrict such a device to engaging in just packet-data communication. (Emergency service calls or the like might be an exception.) Further, the carrier will then allow the device to use its unique pre-activation provisioning data as a basis to gain packet-data connectivity, but the carrier will restrict the device to communicating with just the provisioning server.

Once the device gains packet-data connectivity, the device will then enter into a data session with the provisioning server to set up an account and acquire further post-activation provisioning data, such as a MIN and a username tied to the account. For instance, the server and device may engage in a wireless web session or the like, through which the server will collect account information from the user (to establish a new account for the user or to identify an existing account for the user). The server or another entity on the carrier's network may then assign post-activation provisioning data, such as a unique MIN and username, to the device and send that post-activation provisioning data to the device. As in a conventional over-the-air provisioning process, the device may then receive and programmatically store that post-activation provisioning data in its NAM block for later use.

Thereafter, when the device seeks to gain RF connectivity and packet-data connectivity, the device will conventionally use the data in its NAM block for authentication and access, and the carrier will grant access commensurate with the user's service plan. For instance, when the device seeks to gain RF connectivity, the device may use its post-activation MIN, post-activation ESN and post-activation A-key, and when the device seeks to engage in packet-data communication, the device may use its post-activation username and post-activation password.

Advantageously, by pre-configuring all (or many) new wireless devices with the same set of pre-activation provisioning data and allowing the devices to gain RF connectivity using that generic set of data, a carrier can avoid the need to distinguish between the devices at that stage. Thus, for instance, the authentication system that the carrier employs in granting RF connectivity need not determine which specific device is seeking to gain RF connectivity. All that would matter is that the device seeking to gain RF connectivity is device that is not yet provisioned for service, so the carrier may tunnel such a device to its provisioning server to be activated.

BRIEF DESCRIPTION OF THE DRAWINGS

An exemplary embodiment of the present invention is described herein with reference to the drawings, in which:

FIG. 3 is a flow chart, depicting functions that can be carried out in accordance with the exemplary embodiment.

DETAILED DESCRIPTION OF AN EXEMPLARY EMBODIMENT

1. Exemplary Wireless Communication System

Figure 1:
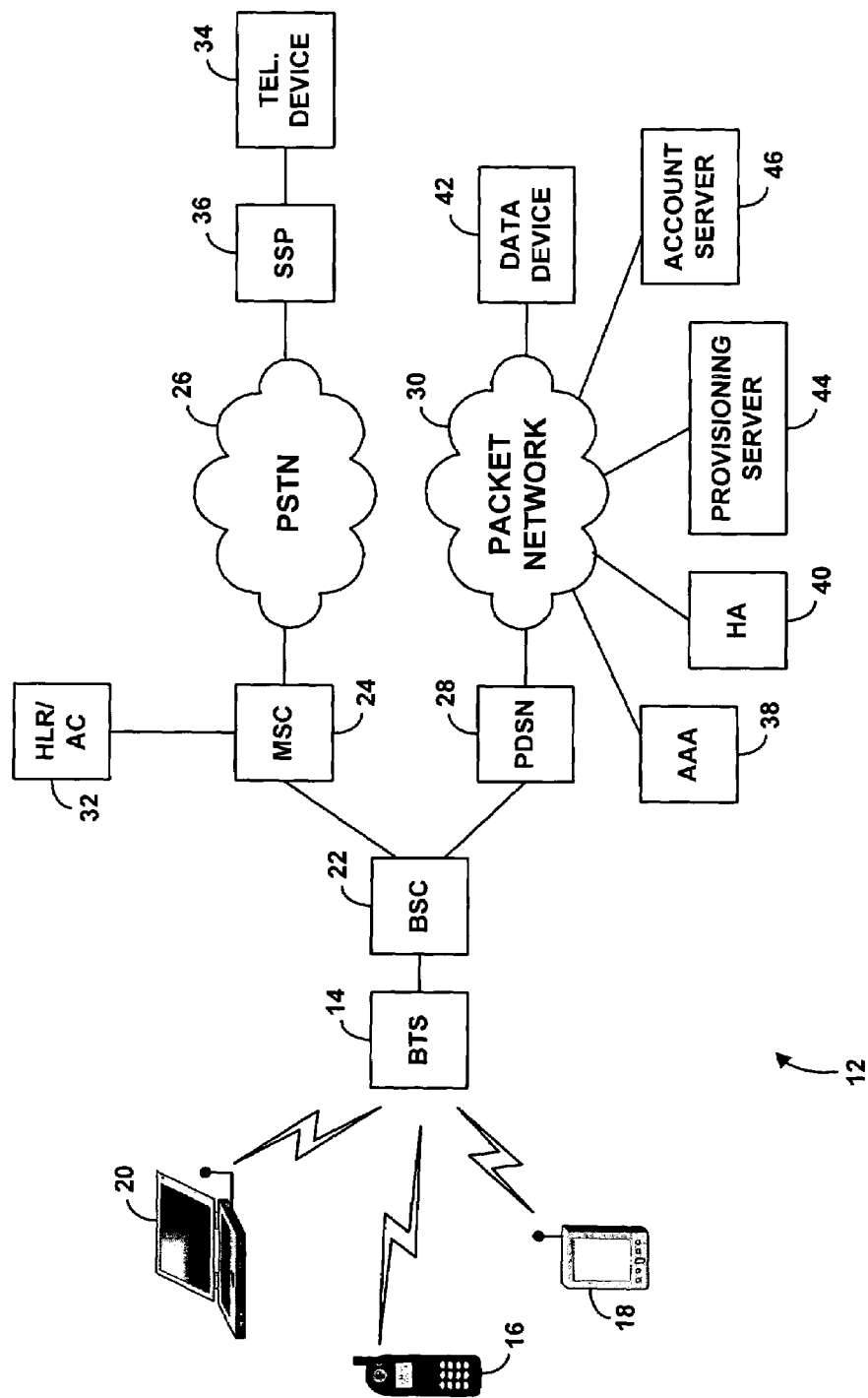
FIG. 1 is a simplified block diagram of a wireless communication system in which the exemplary embodiment can be carried out.

Referring to the drawings, FIG. 1 is a simplified block diagram of a typical wireless communication system 12 in which an exemplary embodiment of the invention can be carried out. It should be understood, however, that this and other arrangements shown and described herein are exemplary only, and that many variations are possible. For instance, various elements could be combined, distributed, added or omitted. Further, it should be understood that entities described as carrying out various functions can be arranged to carry out those functions through software, firmware and/or hardware logic.

As generally illustrated in FIG. 1, the wireless communication system 12 includes a BTS 14 that radiates to provide an RF coverage area within which wireless devices can operate. The wireless devices can be fixed or mobile devices and can take various forms, examples of which include a cell phone 16, a wirelessly-equipped PDA 18 and a wirelessly-equipped personal computer 20, among others. Although only three such devices are depicted in FIG. 1, system 12 could in theory support any number of wireless devices.

As further illustrated, BTS 14 is coupled with a BSC 22, which controls signaling over the RF air interface between the BTS and the wireless devices. In turn, BSC 22 is coupled with or integrated into an MSC 24, which provides connectivity with a circuit-switched network such as the PSTN 26. Additionally, BSC 22 is coupled with a PDSN or other gateway 28, which provides connectivity with a packet-switched network 30, such as a wireless carrier's core packet network and/or the Internet. (Typically, the PDSN would connect with a carrier's core network, and the core network would connect via a firewall with the Internet.)

Conventionally, MSC 24 is coupled via a carrier's signaling network (not shown) with a home location register (HLR)/authentication center (AC) 32, as defined by well known industry standard ANSI-41. (The HLR/AC is just one example of a network authentication entity; other examples include the HLR itself and the AC itself.) In this regard, the MSC 24 and HLR/AC 32 would normally communicate with each other according to the messaging and procedures defined by ANSI-41 and other well known industry standards such as ANSI-771 for instance. However, the manner of communication could take other forms as well.

Conventionally, HLR/AC 32 and MSC 24 work together to authenticate and admit wireless devices seeking to gain RF connectivity so as to be able to communicate via the carrier's system. For this purpose, HLR/AC 32 contains subscriber account information that indicates provisioning data, such as MIN, ESN and A-key, for each wireless device that subscribes to service in the serving area covered by HLR/AC 32. And the HLR/AC 32 and MSC 24 may be programmed to engage in a standard authentication process based on this provisioning data when a wireless device seeks to gain RF connectivity.

Further, the HLR/AC 32 (particularly, the HLR portion) would conventionally maintain or have access to a list of all MIN/ESN pairs that subscribe to service as well as an indication of which of those MIN/ESN pairs are currently in use at any given time. The HLR/AC 32 may then be programmed to check the MIN/ESN pair of any wireless device seeking to gain RF access, so as to ensure that the MIN/ESN pair is a valid pair and is not already in use by another device.

Thus, by way of example, when a wireless device seeks to register in the serving system of the MSC 24, the device would conventionally send an ANSI-41 Registration Request (REGREQ) message via an air interface access channel, and via the BTS 14 and BSC 22, to MSC 24. The Registration Request message would typically carry (i) the device's MIN and ESN, (ii) an authentication result (AU-THR) that the device computed using a predefined algorithm as a function of its MIN, ESN, A-key and perhaps other data, and (iii) one or more other parameters, such as a random number (RANDC) previously broadcast by the serving MSC 24.

Upon receipt of the Registration Request, the MSC 24 may pre-validate the wireless device by checking to ensure that the random number (RANDC) provided by the device is correct. In turn, the MSC 24 may send an ANSI-41 Authentication Request (AUTHREQ) message to the HLR/AC 32, providing the HLR/AC with the MIN and ESN. The HLR/AC would then validate that the MIN/ESN pair, to ensure that it is a valid pair and that it is not already in use. Further, the HLR/AC would compute its own AUTHR, applying the sane predefined algorithm as a function of the MIN, ESN and the A-key that the HLR/AC has on record for the device and would send the AUTHR in an authreq return result message to the MSC. The MSC would then compare the HLR/AC-computed AUTHR with the device-computed AUTHR. If they match, then the MSC may grant the device RF access; otherwise, the MSC may deny the access request.

If the wireless device is capable of engaging in telephone communication over the PSTN 26, then once the device has acquired RF connectivity, the device may place and receive voice calls. For instance, the device may engage in a voice call in communication with a remote telephone device 34 tied to the PSTN 26 via a service switching point (SSP) or other switch 36.

In addition, sitting on packet network 30 may conventionally be an authentication, authorization, and accounting (AAA) server 38 and a mobile-IP home agent (HA) 40. The AAA server 38 functions to authenticate a device that is seeking to gain packet-data connectivity (e.g., to acquire an IP address), and to keep accounting records reflecting the extent of data communication per device, for billing purposes. As such, the AAA server would typically maintain or have access to a list of usernames and passwords for subscriber accounts, so that the AAA server can validate a username/password pair provided by a device when the device seeks to gain packet-data connectivity. The home agent 40, in turn, conventionally functions to assign mobile-IP addresses and to manage mobility of devices across networks or sub-networks.

In typical practice, when a wireless device seeks to gain packet-data connectivity (e.g., upon user request or autonomously), the device would send an ANSI-41 Origination Request (ORREQ) message via an air interface access channel, and via BTS 14 and BSC 22, to MSC 24. The Origination Request message would carry a "packet data" service option code, which signals to the MSC that the device is seeking to gain packet-data connectivity rather than trying to place a conventional voice call. In response to the packet-data service option code, the MSC would then signal to the BSC 22, and a packet-control-function (PCF) in the BSC would then signal to the PDSN 28 for further processing.

The PDSN 28 and the device would then engage in a standard negotiation to establish a data link layer connection, typically a point-to-point protocol (PPP) session over which packet-data can be exchanged between the wireless device and the PDSN. With that data link layer connection established, the wireless device would then conventionally send a mobile-IP Registration Request message to the PDSN, seeking to acquire a mobile-IP address to facilitate packet-data communication. The mobile-IP Registration Request message would carry the device's username and password, among other information.

Conventionally, the PDSN would then send the Registration Request to the AAA server 38, which may validate the username/password combination, among other actions. The PDSN would then send the Registration Request message to the mobile-IP home agent 40, which would assign and send a mobile-IP address in a registration reply message to the PDSN. In turn, the PDSN would send the registration reply message to the wireless device, providing the mobile-IP address. And the wireless device may then commence IP communication using that mobile-EP address. For instance, the wireless device may then engage in a wireless web (e.g., HTTP) session or other IP-based communication with a remote data device (e.g., server) 42 on packet network 30.

In accordance with the exemplary embodiment, the carrier may further operate a provisioning server 44 and an account server 46 on its core packet network. The account server 46 may function to maintain service account records for devices served by the carrier. And the provisioning server 44 may function as an interface between wireless devices and account server 46. In this regard, the provisioning server 44 may be arranged as a web server, so that it can communicate with a web browser on a wireless device. Further, the provisioning server 44 may be arranged to function as a conventional OTAF, so that it can provision a wireless device with post-activation provisioning data such as a MIN and username in a manner well known in the art. The provisioning server 44 is preferably located at a predefined address on the carrier's network, so that packet-data from a wireless device can be directed to the provisioning server.

2. Exemplary Wireless Devices

In accordance with the exemplary embodiment, a wireless carrier will distribute multiple wireless devices that can be provisioned to operate on the wireless carrier's network, and each device will come configured with (i) a set of pre-activation provisioning data and (ii) a set of post-activation provisioning data. Optimally, the set of pre-activation provisioning data on each device will include some generic authentication data such as a generic MIN/ESN pair that is the same on all of the devices.

Figure 2:
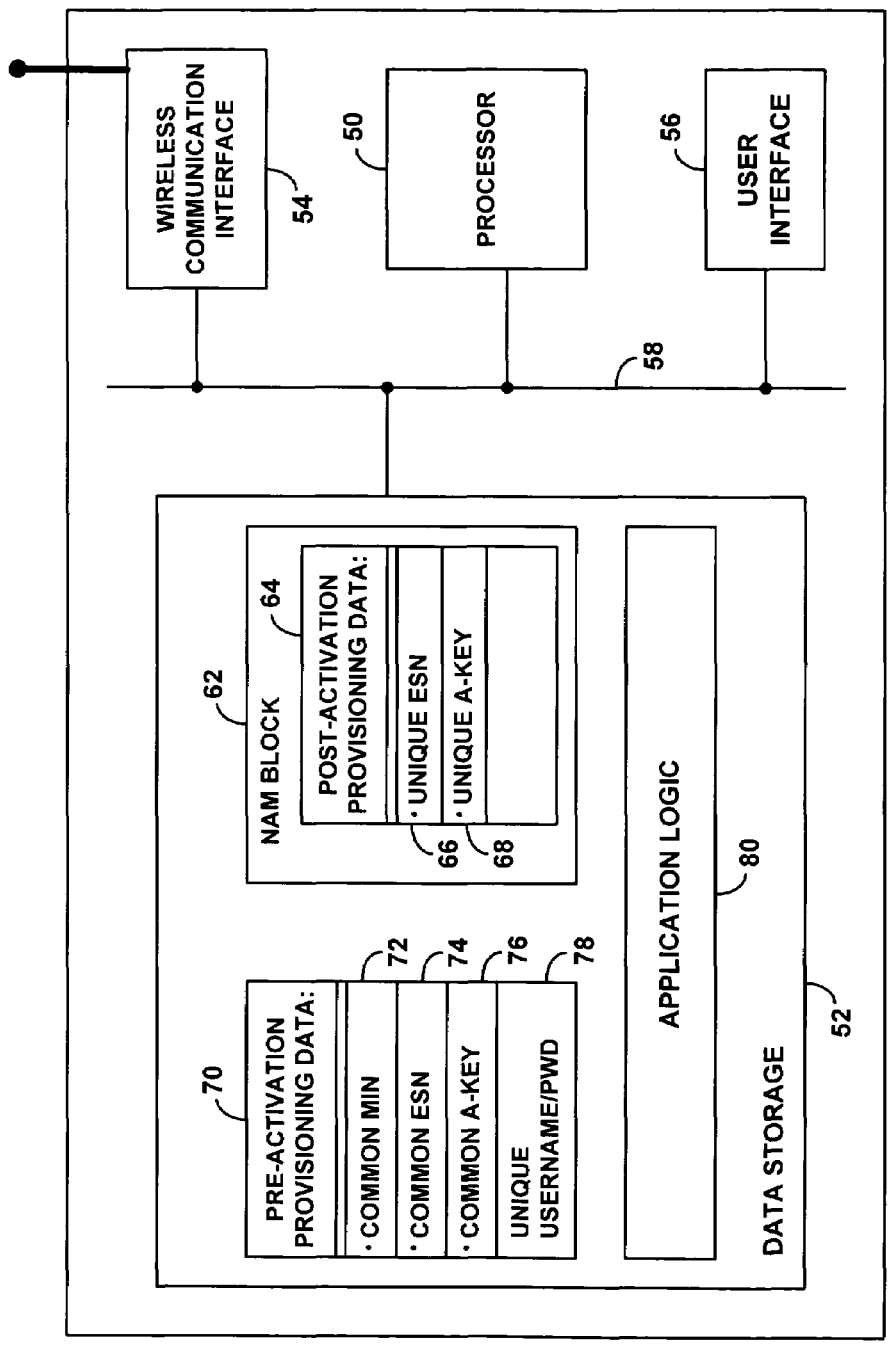
FIG. 2 is a functional block diagram of an exemplary wireless devices in accordance with the exemplary embodiment.

FIG. 2 is a functional block diagram of an exemplary wireless device, which could be how devices 16 and 18 (the cell phone and PDA), for example, may appear when the carrier first distributes them to subscribers. Each device 16, 18 includes a processor 50, data storage 52, a wireless communication interface 54, and a user interface 56, all of which may be tied together by a system bus or other mechanism 58.

The processor 50 may comprise one or more general purpose microprocessors and/or dedicated signal processors. (The term "processor" encompasses either a single processor or multiple processors that could work in combination.) The data storage 52, in turn, may comprise volatile memory, non-volatile memory (e.g., Flash ROM or storage drive), and/or other sorts of storage space and could be integrated in whole or in part with processor 50. Wireless communication interface 54 may include an antenna 60 and a standard chipset for engaging in wireless communication according to an accepted protocol such as CDMA, TDMA, or GSM, for instance, or according to another specified protocol. By way of example, the chipset could be an MSM6700™ chipset available from Qualcomm Incorporated of San Diego, Calif., which supports voice and data communication according to the well known CDMA2000 protocol. User interface 56 may then include input and output mechanisms, such as a microphone, keypad, display and speaker, for instance, to facilitate interaction with a user.

Conventionally, the data storage 52 in each device may define a NAM block 62, which serves to hold post-activation provisioning data such as MIN, ESN, A-key, username and password, that the device can use as a basis to gain network connectivity once the device has been activated for service. In accordance with the exemplary embodiment, before the device has been officially provisioned for service (i.e., before it has been tied to a service account and given a MIN), its NAM block 62 will contain limited post-activation provisioning data 64, such as a unique ESN 66 of the type normally assigned to a device upon manufacture, and perhaps a unique A-key 68.

Further, in accordance with the exemplary embodiment, the data storage 52 of each device will contain a set pre-activation provisioning data 70 as described above. In particular, the pre-activation provisioning data 70 in each device will preferably include (i) a common MIN 72, (ii) a common ESN 74, (iii) a common A-key 76 and (iv) a unique username/password pair 78. As noted above, this pre-activation provisioning data will be used to gain RF connectivity and packet-data connectivity, so that the carrier's provisioning server can then officially provision the device.

In addition, the data storage 52 on each device 16, 18, will preferably include a set of application logic 80 that is executable by the processor 50 on the device to carry out various functions described herein. For example, the application logic 80 may be arranged (i) to detect, upon power-on, that the device is not yet provisioned with a post-activation MIN in its NAM block, and (ii) to responsively use the device's pre-activation provisioning data 70 to gain RF connectivity and packet-data connectivity and to communicate with provisioning server 44.

In particular, in response to a determination that the device does not yet have a MIN in its NAM block, the application logic 80 may cause the device to send to MSC 24 a Registration Request message that carries the common pre-activation MIN, ESN and A-key, so as to then gain limited RF connectivity as described above. In turn, the application logic may originate a PPP session with the PDSN 28 and send a mobile-IP Registration Request message that carries its unique pre-activation username/password, so as to then gain packet-data connectivity as described above. In this regard, the application logic 80 may be arranged to autonomously initiate the data session, or the application logic 80 may prompt the user to initiate the session. For instance, in response to the absence of a MIN (or the absence of a username/password) in the NAM block the application logic 80 could present the user with a screen display that indicates the device needs to be provisioned in order to be used, and the user then could engage a soft key or other mechanism to cause the device to initiate the data session.

Once the device has acquired packet data connectivity, the application logic 80 may then send an HTTP request or other data message to the predefined network address of the provisioning server 44, so as to commence a provisioning session. In this regard, the application logic preferably defines a web browser application (such as Openwave Mobile Browser™ or Microsoft Internet Explorer™, for instance), for sending HTTP or other web requests and for receiving and rendering web content. Through the browser, the device may thus receive and display prompts asking the user to provide billing information (such as name, address and credit card number, or such as an identifier of an existing account with the carrier), and may send the user-provided billing information to provisioning server 44. Further, through the browser or in some other way, application logic 80 may receive post-activation provisioning data that the carrier has assigned to the device, such as a MIN and username/password, and may store that data in NAM block 62.

After engaging in this automated provisioning process, the device can then conventionally use the post-activation data stored in its NAM block 62 the next time it seeks to gain network connectivity. In particular, when the device seeks to gain RF connectivity, application logic 80 may detect that the NAM block contains a post-activation MIN and may responsively use that MIN and the device's post-activation ESN as a basis to gain RF connectivity. Further, when the device seeks to gain packet-data connectivity, application logic 80 may detect that the NAM block contains a post-activation username/password and may responsively use that username/password as a basis to gain packet-data connectivity.

3. Exemplary Pre-Activation Provisioning Data

In the exemplary embodiment, the common MIN, ESN and A-key stored on each device as pre-activation preferably take the same form as normal MINs, ESNs and A-keys, so that the network can handle them as the network normally handles MINs, ESNs and A-keys. However, the common MIN, ESN and A-key will have designated values that the network will recognize as pre-activation data. For instance, if a MIN is normally a 10 digit number, the common MIN on each device might be a specially designated 10-digit number, such as 000-111-0000, that the network will recognize as a pre-activation MIN. Similarly, if an ESN is normally a 32-bit serial number, the common ESN on each device might be a specially designated 32-bit pattern that the network will recognize as a pre-activation ESN.

The username that is stored on each device as pre-activation data, on the other hand, is unique to the device. However, in the exemplary embodiment, each pre-activation username will include some common designation or code that will allow the network to recognize the username as a pre-activation username. For example, if each username is an NAI of the form name@realm (as defined by the well known RFC 2486), each username can have a unique name segment but a common realm segment such as "preactivation.com". Thus, for instance, the pre-activation username on device 16 might be "device16@preactivation.com," while the pre-activation username on device 18 might be "device18@preactivation.com."

4. Exemplary Network Arrangement

Optimally, the wireless carrier's network will recognize that a device seeking to gain RF connectivity or packet-data connectivity is using pre-activation provisioning data to do so, and the network will allow the device to gain connectivity but will limit the device to communicate with the provisioning server. In order to accomplish this in the exemplary embodiment, several elements in the network will preferably be modified (through suitable programming logic or the like) as follows.

First, the HLR/AC 32 will preferably be set to authenticate any wireless device that seeks to gain RF connectivity using the common pre-activation MIN and ESN (and perhaps the common A-key). In this regard, the HLR/AC 32 can be flagged to allow multiple devices to concurrently register in the network with the same MIN/ESN pair, namely, the common pre-activation MIN/ESN pair. (This can be as simple as a setting a Boolean indication in connection with the MIN/ESN pair, in the list of MIN/ESN pairs maintained by the HLR/AC.) The HLR/AC might also be set to compute an authentication result based on the common pre-activation A-key and to send that authentication result to the MSC 24 so that it will match an authentication result computed by the device seeking access. Alternatively, the HLR/AC can be set to forego computation of an authentication result and to simply send a positive authreq return result to the MSC 24 whenever the MIN/ESN pair of the device seeking access is the common pre-activation MIN/ESN pair.

Second, the MSC 24 will preferably be set to block anything but packet-data origination requests coming from a wireless device that is operating under the pre-activation MIN/ESN. In this regard, when a wireless device seeks to originate a communication, whether a voice call or a data session, the device normally sends to the MSC an Origination Request message that carries its MIN and ESN. It is known for a switch to be able to route or block call attempts based on the calling party or based on the type of call request. In this instance, the MSC can thus be readily programmed to block voice call attempts from the pre-activation MIN, while allowing data origination requests from such a device.

Third, the AAA server 38 will preferably be set to authenticate any wireless device that seeks to gain packet-data connectivity using a pre-activation username/password. In this regard, as noted above, each pre-activation username could have a portion that indicates it is a pre-activation username (e.g., a realm such as "preactivation.com") as well as a portion that uniquely identifies the device (e.g., "device16" or "device18"), so the AAA server could be set to simply validate the device (sending a positive response to the PDSN) when the AAA server sees that the device is operating under a pre-activation username.

Fourth, the PDSN 28 may be set to tunnel to the provisioning server 44 any data traffic that comes from a wireless device operating under a pre-activation username, so as to preclude such a wireless device from engaging in packet-data communication with other entities on network 30 (such as remote data device 42, for instance). In this regard, when the device first acquires an IP address, the PDSN could flag the IP address as one assigned to a device operating under a pre-activation username (e.g., "name@preactivation.com"). Then, when the PDSN receives packet-data originating from that IP address, the PDSN could route the packet data to the provisioning server 44, regardless of what destination IP address is indicated in the data. Alternatively, if the data from the device includes a pre-activation username in a header (e.g., in an HTTP header), the PDSN could detect that pre-activation username and route the data to the provisioning server.

Fifth, the provisioning server 44 will preferably be arranged to receive an HTTP request or other sort of web request from a device operating under a pre-activation username, and to thereby identify the device. The HTTP request would conventionally carry the username in an HTTP header, and so the provisioning server could simply read the username from the header. In the exemplary embodiment, the provisioning server would then maintain or have access to a set of data that correlates pre-activation usernames with unique post-activation ESNs, and so the provisioning server can simply map the pre-activation username from the HTTP header to the device's actual ESN, so as to determine what device is seeking access.

In turn, the provisioning server 44, interacting with account server 46, will then be arranged to engage in an automated provisioning session with the device. In particular, as noted above, the provisioning server will respond to the HTTP request from the device with an HTTP response comprising a user prompt for billing information. The prompt could seek the user's name, address and credit card information and/or could seek from the user an identifier of an already-established user account with the carrier. The prompt may define an HTTP POST link that would cause the device to send user-entered billing information to the provisioning server.

The provisioning server or other entity may then be arranged to assign post-activation provisioning data, such as a unique MIN and unique username/password (and perhaps a unique A-key, if the device does not have one already) to the device, and the account server 46 would record that information in the user's account, tying the newly assigned MIN together with the ESN that the provisioning server determined by the pre-activation username.

The provisioning server may then be arranged to send the post-activation provisioning data to the device. For instance, the provisioning server could send the post-activation provisioning data to the device in a predefined XML format within an HTTP request message, to be read and stored by the device in the device's NAM block. The provisioning server may use conventional OTASP techniques for sending such information to the device.

5. Exemplary Process Flow

Referring to FIG. 3, a flow chart is provided to help illustrate some of the functions that can be carried out in accordance with the exemplary embodiment. As shown in FIG. 3, at block 100, a wireless carrier distributes multiple wireless devices, including device 16 and device 18. Each device preferably includes stored pre-activation provisioning data and stored post-activation provisioning data as described above. At block 102, the carrier then receives into its network from a device 16 a registration request that carries the common pre-activation provisioning data. And at block 104, the carrier grants RF connectivity to device 16 in response to at least that common pre-activation provisioning data.

At block 106, the carrier then receives into the network from device 16 a mobile-IP registration request carrying the unique pre-activation provisioning data of the device. And at block 108, the carrier grants packet-data connectivity to device 16 in response to at least the unique pre-activation provisioning data of the device.

At block 110, the carrier further receives into the network from the device 16 a packet-data communication, such as an HTTP request. And at block 112, the carrier sends the packet-data communication to a provisioning server to trigger a provisioning session between the provisioning server and the device 16. During the provisioning session, at block 114, the provisioning server collects billing information from the device 16 and, at block 116, the provisioning server sends further post-activation provisioning data to the device. In the exemplary embodiment, the further post-activation data may comprise a MIN unique to device 16.

At block 118, device 16 may then engage in wireless communication service commensurate with its service plan, using its post-activation data as a basis to connectivity.

At the same time, or at some other time, at block 120, the carrier receives into its network from a device 18 a registration request that carries the common pre-activation provisioning data. And at block 122, the carrier grants RF connectivity to device 18 in response to at least that common pre-activation provisioning data.

In turn, at block 124, the carrier receives into the network from device 18 a mobile-IP registration request carrying the unique pre-activation provisioning data of device 18. And at block 126, the carrier grants packet-data connectivity to device 18 in response to at least the unique pre-activation provisioning data of the device.

At block 128, the carrier further receives into the network from the device 18 a packet-data communication, such as an HTTP request. And at block 130, the carrier sends the packet-data communication to the provisioning server to trigger a provisioning session between the provisioning server and the device 18. During the provisioning session, at block 132, the provisioning server collects billing information from device 18 and, at block 134, the provisioning server sends further post-activation provisioning data to device 18. In the exemplary embodiment, the further post-activation data may comprise a MIN unique to device 18.

At block 136, device 18 may then engage in wireless communication service commensurate with its service plan, using its post-activation data as a basis to connectivity.

6. Conclusion

An exemplary embodiment of the present invention has been described above. Those skilled in the art will understand, however, that changes and modifications may be made to this embodiment without departing from the true scope and spirit of the present invention, which is defined by the claims.

What is claimed is:

1. A method comprising:
   granting radio network access to a first wireless device operating under a given mobile identification number (MIN) and a given electronic serial number (ESN), and then engaging in a first over-the-air activation process to establish a first subscriber account for the first wireless device and to program the first wireless device with a first new MIN; and
   granting radio network access to a second wireless device operating under the same given MIN and the same given ESN, and then engaging in a second over-the-air phone activation process to establish a second subscriber account for the second wireless device and to program the second wireless device with a second new MIN different than the first new MIN,
   wherein granting radio network access to the first wireless device operating under the given MIN and the given ESN comprises receiving a first registration request from the first wireless device and responsively sending a first authentication request carrying the given MIN and given ESN to an authentication entity, and receiving from the authentication entity, in response to the first authentication request, a first authentication response,
   wherein granting radio network access to the second wireless device operating under the given MIN and the given ESN comprises receiving a second registration request from the second wireless device and responsively sending a second authentication request carrying the given MIN and given ESN to the authentication entity, and receiving from the authentication entity, in response to the second authentication request, a second authentication response,
   wherein the authentication entity comprises at least one of a home location register (HLR) and an authentication center (AC),
   wherein the authentication entity allows multiple wireless devices to operate concurrently under the given MIN and given ESN, and
   wherein the authentication entity also receives and responds to authentication requests for previously-activated wireless devices.

2. The method of claim 1, further comprising:
   granting radio network access to the first wireless device operating under the first new MIN; and
   granting radio network access to the second wireless device operating under the second new MIN.

3. The method of claim 1, further comprising:
   maintaining in a switch a set of logic that blocks a given wireless device from originating voice calls if the wireless device is operating under the given MIN and the given ESN but that allows the given wireless device to originate a packet data session if the given wireless device is operating under the given MIN and the given ESN.

4. The method of claim 1, further comprising:
   after granting radio network access to the first wireless device, allowing the first wireless device to enter into a first packet-data session with a provisioning server, wherein engaging in the first over-the-air activation process comprises the provisioning server engaging in the first over-the-air activation process with the first wireless device; and
   after granting radio network access to the second wireless device, allowing the second wireless device to enter into a second packet-data session with the provisioning server, wherein engaging in the second over-the-air activation process comprises the provisioning server engaging in the second over-the-air activation process with the second wireless device.

5. The method of claim 1,
wherein engaging in the first over-the-air activation process comprises (i) exchanging web communications between the provisioning server and the first wireless device to collect user data for the first subscriber account, and (ii) sending the first MIN from the provisioning server to the first wireless device for the first wireless device to record in data storage for later use; and
wherein engaging in the second over-the-air activation process comprises (i) exchanging web communications between the provisioning server and the second wireless device to collect user data for the second subscriber account, and (ii) sending the second MIN from the provisioning server to the second wireless device for the first wireless device to record in data storage for later use.

6. The method of claim 1,
wherein the first wireless device is selected from the group consisting of a cell phone, a personal digital assistant and a wirelessly-equipped personal computer; and
wherein the second wireless device is selected from the group consisting of a cell phone, a personal digital assistant and a wirelessly-equipped personal computer.

7. A method comprising:
distributing a plurality of wireless devices to users, wherein each wireless device of the plurality of wireless devices includes stored pre-activation provisioning data and stored post-activation provisioning data, wherein the stored pre-activation provisioning data on all of the wireless devices includes (i) common authentication data that is the same on all of the wireless devices, the common authentication data comprising a common mobile identification number (MIN) and a common electronic serial number (ESN) and (ii) unique authentication data that is different per wireless device;
receiving into a network from a first of the wireless devices a first registration request that carries the common authentication data, and granting radio frequency (RF) connectivity to the first wireless device in response to at least the common authentication data carried in the first registration request; and
receiving into the network from a second of the wireless devices a second registration request that carries the common authentication data, and granting RF connectivity to the second wireless device in response to at least the common authentication data carried in the second registration request,
wherein granting radio network access to the first wireless device comprises receiving a first registration request from the first wireless device and responsively sending a first authentication request carrying the given MIN and given ESN to an authentication entity, and receiving from the authentication entity, in response to the first authentication request, a first authentication response,
wherein granting radio network access to the second wireless device operating under the given MIN and the given ESN comprises receiving a second registration request from the second wireless device and responsively sending a second authentication request carrying the given MIN and given ESN to the authentication entity, and receiving from the authentication entity, in response to the second authentication request, a second authentication response,
wherein the authentication entity comprises at least one of a home location register (HLR) and an authentication center (AC),
wherein the authentication entity allows multiple wireless devices to operate concurrently under the given MIN and given ESN, and
wherein the authentication entity also receives and responds to authentication requests for previously-activated wireless devices.

8. The method of claim 7, further comprising:
receiving into the network from the first wireless device a first mobile-IP registration request carrying the unique pre-activation provisioning data of the first wireless device, and granting packet-data connectivity to the first wireless device in response to at least the unique pre-activation provisioning data of the first wireless device;
receiving into the network from the second wireless device a second mobile-IP registration request carrying the unique pre-activation provisioning data of the second wireless device, and granting packet-data connectivity to the second wireless device in response to at least the unique pre-activation provisioning data of the second wireless device;
receiving into the network from the first wireless device a first packet-data communication, and sending the first packet-data communication to a provisioning server to trigger a provisioning session between the provisioning server and the first wireless device, in which the provisioning server collects billing information from the first wireless device and sends further post-activation provisioning data to the first wireless device; and
receiving into the network from the second wireless device a second packet-data communication, and sending the second packet-data communication to a provisioning server to trigger a provisioning session between the provisioning server and the second wireless device, in which the provisioning server collects billing information from the second wireless device and sends further post-activation provisioning data to the second wireless device.

9. The method of claim 7,
wherein the unique pre-activation provisioning data includes a unique username; and
wherein the stored post-activation provisioning data on each device includes an electronic serial number that is different per wireless device.

10. The method of claim 9, wherein the pre-activation provisioning data further includes a common authentication-key (A-key).

11. The method of claim 7, wherein each of the first and second wireless devices is selected from the group consisting of a cell phone, a personal digital assistant and a wirelessly-equipped personal computer.

12. The method of claim 7, wherein distributing the plurality of wireless devices comprises selling the plurality of wireless devices.

13. A wireless device comprising:
a processor;
data storage;
a wireless communication interface; and
a user interface,
wherein the data storage contains pre-activation provisioning data and initial post-activation provisioning data, wherein the pre-activation provisioning data comprises a mobile identification number and electronic serial number (MIN-ESN) pair that is the same as a MIN-ESN pair stored as pre-activation provisioning data on at least one other wireless device, and wherein the initial post-activation provisioning data comprises an ESN that is unique to the wireless device, wherein the data storage further contains application logic executable by the processor to use the pre-activation MIN-ESN pair as a basis to request radio frequency (RF) connectivity from a wireless carrier, and wherein, by using the MIN-ESN pair to gain RF connectivity, the wireless device is authenticatable by a network authentication entity that also authenticates previously-activated wireless devices based on MIN and ESN.

14. The wireless device of claim 13, wherein the application logic is further executable by the processor (i) to engage in a data session with a provisioning server, (ii) to send billing information to the provisioning server, and (iii) to receive and store further post-activation provisioning data from the provisioning server, wherein the further post-activation provisioning data comprises a post-activation MIN unique to the wireless device, whereby the post-activation ESN and post-activation MIN are usable in combination by the wireless device to thereafter gain RF connectivity.

15. The wireless device of claim 13, wherein the device is selected from the group consisting of a cell phone, a personal digital assistant and a wirelessly-equipped personal computer.

16. The wireless device of claim 13, wherein the initial post-activation provisioning data is stored in a Number Assignment Module (NAM) block of the data storage, and wherein the application logic is executable to determine that the NAM block does not contain a MIN and to responsively use the pre-activation pair as a basis to request RF connectivity.

17. A method comprising:

storing concurrently in a wireless device both pre-activation provisioning data and post-activation provisioning data, wherein the pre-activation provisioning data comprises a common mobile identification number and electronic serial number (MIN-ESN) pair that is the same as a MIN-ESN pair stored as pre-activation provisioning data on at least one other wireless device, and wherein the post-activation provisioning data comprises an ESN that is unique to the wireless device;

sending from the wireless device into a network a registration request carrying the common MIN-ESN pair, so as to acquire radio frequency (RF) connectivity, wherein, by using the MIN-ESN pair to gain RF connectivity, the wireless device is authenticatable by a network authentication entity that also authenticates previously-activated wireless devices based on MIN and ESN.

18. The method of claim 17, further comprising, after acquiring RF connectivity:

sending from the wireless device into the network a data communication, and then receiving into the wireless device a request for billing information to set up a service account for the wireless device;

sending the requested billing information from the wireless device into the network; and receiving from the network a post-activation MIN tied to the service account, and storing the post-activation MIN in the wireless device.

19. The method of claim 18, further comprising, after storing the post-activation MIN:

using the post-activation MIN and post-activation ESN as a basis to gain RF connectivity.

20. A cellular telephone activation system comprising:

a radio network access system arranged to grant radio network access concurrently to multiple cellular telephones operating under a common mobile identification number and electronic serial number (MIN-ESN) pair; and an over the air activation system arranged to engage in web communication with a cellular telephone operating under the common MIN-ESN pair and to program the cellular telephone with a new MIN, wherein the radio network access system grants radio network access to each cellular telephone at least in part by receiving from the cellular telephone a registration request carrying the common MIN-ESN pair, responsively conveying an authentication request carrying the common MIN-ESN pair to an authentication entity, and receiving from the authentication entity, in response to the authentication request, an authentication response, wherein the authentication entity comprises at least one of a home location register (HLR) and an authentication center (AC), wherein the authentication entity allows multiple wireless devices to operate concurrently under the common MIN-ESN pair, and wherein the authentication entity also receives and responds to authentication requests for previously-activated wireless devices.

* * * * *